United States Patent
Hayes et al.

(10) Patent No.: US 11,603,422 B2
(45) Date of Patent: Mar. 14, 2023

(54) POLYMERIC RESIN FOR DIELECTRIC APPLICATIONS

(71) Applicant: Rohm and Haas Electronic Materials LLC, Marlborough, MA (US)

(72) Inventors: Colin Hayes, Hudson, MA (US); Colin Calabrese, Marlborough, MA (US); Michael K Gallagher, Hopkinton, MA (US); Robert K Barr, Shrewsbury, MA (US)

(73) Assignee: ROHM AND HAAS ELECTRONIC MATERIALS LLC, Marlborough, MA (US)

( * ) Notice: Subject to any disclaimer, the term of this patent is extended or adjusted under 35 U.S.C. 154(b) by 0 days.

(21) Appl. No.: 17/106,277

(22) Filed: Nov. 30, 2020

(65) Prior Publication Data

US 2021/0198395 A1    Jul. 1, 2021

Related U.S. Application Data

(60) Provisional application No. 62/954,732, filed on Dec. 30, 2019.

(51) Int. Cl.

| | | |
|---|---|---|
| C08F 212/32 | (2006.01) | |
| C08F 228/06 | (2006.01) | |
| C08F 226/06 | (2006.01) | |
| C08F 212/12 | (2006.01) | |
| C08F 236/02 | (2006.01) | |
| C08F 226/12 | (2006.01) | |
| C08F 236/04 | (2006.01) | |
| C08F 212/04 | (2006.01) | |
| C08F 212/08 | (2006.01) | |

(52) U.S. Cl.
CPC .......... *C08F 212/32* (2013.01); *C08F 212/12* (2013.01); *C08F 226/06* (2013.01); *C08F 228/06* (2013.01); *C08F 236/02* (2013.01); *C08F 212/04* (2013.01); *C08F 212/08* (2013.01); *C08F 226/12* (2013.01); *C08F 236/04* (2013.01)

(58) Field of Classification Search
CPC .... C08F 212/32; C08F 212/12; C08F 212/08; C08F 212/04; C08F 228/06; C08F 226/06; C08F 226/12; C08F 226/02; C08F 226/04; C08F 226/045; C08F 226/08; C08F 226/10; C08F 226/20; C08F 226/22; C08F 236/02; C08F 236/04; C08F 236/045; C08F 236/06; C08F 236/08; C08F 236/10; C08F 236/20; C08F 236/22
See application file for complete search history.

(56) References Cited

U.S. PATENT DOCUMENTS

| | | | |
|---|---|---|---|
| 2,991,258 A | | 7/1961 | Haward et al. |
| 4,698,394 A | * | 10/1987 | Wong .................... C08F 212/04 525/289 |
| 2002/0161091 A1 | | 10/2002 | Amou et al. |
| 2005/0038196 A1 | * | 2/2005 | Yamazaki ............... C08L 25/06 525/241 |
| 2019/0127505 A1 | * | 5/2019 | Hayes .................. C07D 221/04 |
| 2019/0127506 A1 | * | 5/2019 | Hayes .................. C08F 212/32 |

* cited by examiner

*Primary Examiner* — Ling Siu Choi
*Assistant Examiner* — David L Miller
(74) *Attorney, Agent, or Firm* — S. Matthew Cairns

(57) ABSTRACT

There is provided a polymer which is the copolymerization product from a mixture including: (a) 10-50 mol % of at least one addition polymerizable arylcyclobutene monomer; (b) 15-50 mol % of at least one addition polymerizable diene monomer; and (c) 15-60 mol % of at least one addition polymerizable aromatic vinyl monomer. The polymer can be used in electronic applications.

11 Claims, No Drawings

POLYMERIC RESIN FOR DIELECTRIC APPLICATIONS

FIELD OF THE DISCLOSURE

The present disclosure relates to polymeric resin compositions, methods for preparing such resins and use in manufacturing electronic devices.

BACKGROUND INFORMATION

Polymeric resins are used in spin-on dielectric packaging, circuit boards, laminates, and other electronic applications. The resins need to provide films/coatings having good mechanical properties and good adhesive properties, as well as low dielectric properties. In particular, it is desirable to have high tensile strength, high tensile elongation, good adhesion to copper, and low relative permittivity (Dk) and loss tangent (Df) at high frequencies. In addition, it is desirable to be able to cure the resins at lower temperatures without excessive cure times.

There is a continuing need for dielectric resin compositions which have improved properties.

DETAILED DESCRIPTION

Many aspects and embodiments have been described above and are merely exemplary and not limiting. After reading this specification, skilled artisans appreciate that other aspects and embodiments are possible without departing from the scope of the present disclosure.

As used throughout this specification, the following abbreviations shall have the following meanings, unless the context clearly indicates otherwise: ° C.=degree Celsius; g=gram; nm=nanometer, μm=micron=micrometer; mm=millimeter; sec.=second; and min.=minutes. All amounts are percent by weight ("wt. %") and all ratios are molar ratios, unless otherwise noted. All numerical ranges are inclusive and combinable in any order, except where it is clear that such numerical ranges are constrained to added up to 100%. Unless otherwise noted, all polymer and oligomer molecular weights are weight average molecular weights ('Mw") with unit of g/mol or Dalton, and are determined using gel permeation chromatography compared to polystyrene standards.

The articles "a", "an" and "the" refer to the singular and the plural, unless the context clearly indicates otherwise. As used herein, the term "and/or" includes any and all combinations of one or more of the associated items.

As used in herein, R, $R^a$, $R^b$, R', R" and any other variables are generic designations and may be the same as or different from those defined in the formulas.

As used herein, the term "addition polymerizable" as it applies to monomers, is intended to mean unsaturated monomers that are capable of polymerization by the simple linking of groups without the co-generation of other products.

The term "adjacent" as it refers to substituent groups that are bonded to carbons that are joined together with a single or multiple bond. Exemplary adjacent R groups are shown below:

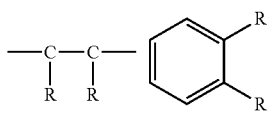

The term "alkoxy" is intended to mean the group RO—, where R is an alkyl group.

The term "alkyl" is intended to mean a group derived from an aliphatic hydrocarbon and includes a linear, a branched, or a cyclic group. A group "derived from" a compound, indicates the radical formed by removal of one or more hydrogen or deuterium. In some embodiments, an alkyl has from 1 to 20 carbon atoms.

The term "aromatic compound" is intended to mean an organic compound comprising at least one unsaturated cyclic group having 4n+2 delocalized pi electrons.

The term "aryl" is intended to mean a group derived from an aromatic compound having one or more points of attachment. The term includes groups which have a single ring and those which have multiple rings which can be joined by a single bond or fused together. Carbocyclic aryl groups have only carbons in a ring structure. Heteroaryl groups have at least one heteroatom in a ring structure.

The term "alkylaryl" is intended to mean an aryl group having one or more alkyl substituents.

The term "aryloxy" is intended to mean the group RO—, where R is an aryl group.

The term "curable" as it applies to a composition, is intended to mean a material that becomes harder and less soluble in solvents when exposed to radiation and/or heat, or under the conditions of use.

The term "liquid composition" is intended to mean a liquid medium in which a material is dissolved to form a solution, a liquid medium in which a material is dispersed to form a dispersion, or a liquid medium in which a material is suspended to form a suspension or an emulsion.

The term "(meth)acrylate" is intended to mean a group which is either an acrylate or a methacrylate.

The term "solvent" is intended to mean an organic compound that is a liquid at room temperature. The term is intended to encompass a single organic compound or mixture of two or more organic compounds.

The terms "film" and "layer" are used interchangeably through this specification.

All ranges are inclusive and combinable. For example, the term "a range of 50 to 3000 cPs, or 100 or more cPs" would include each of 50 to 100 cPs, 50 to 3000 cPs and 100 to 3000 cPs.

In this specification, unless explicitly stated otherwise or indicated to the contrary by the context of usage, where an embodiment of the subject matter hereof is stated or described as comprising, including, containing, having, being composed of or being constituted by or of certain features or elements, one or more features or elements in addition to those explicitly stated or described may be present in the embodiment. An alternative embodiment of the disclosed subject matter hereof, is described as consisting essentially of certain features or elements, in which embodiment features or elements that would materially alter the principle of operation or the distinguishing characteristics of the embodiment are not present therein. A further alternative embodiment of the described subject matter hereof is described as consisting of certain features or elements, in which embodiment, or in insubstantial variations thereof, only the features or elements specifically stated or described are present.

Unless otherwise defined, all technical and scientific terms used herein have the same meaning as commonly understood by one of ordinary skill in the art to which this disclosure belongs. Although methods and materials similar or equivalent to those described herein can be used in the practice or testing of embodiments of the present disclosure, suitable methods and materials are described below. In addition, the materials, methods, and examples are illustrative only and not intended to be limiting.

To the extent not described herein, many details regarding specific materials, processing acts, and circuits are conventional and may be found in textbooks and other sources within the photoresist, organic light-emitting diode display, photodetector, photovoltaic cell, and semi-conductive member arts.

There is provided a polymer comprising a copolymerization product from a mixture comprising: (a) 10-50 mol % of at least one addition polymerizable arylcyclobutene monomer; (b) 15-50 mol % of at least one addition polymerizable diene monomer; and (c) 15-60 mol % of at least one addition polymerizable aromatic vinyl monomer based on the total monomers present in the copolymerization.

The addition polymerizable arylcyclobutene monomer is an arylcyclobutene having at least one addition polymerizable substituent. The substituent can be a vinyl group, an allyl group, or a (meth)acrylate group. The monomer can be present in an amount of 20-40 mol %, based on the total monomers present in the copolymerization.

In some embodiments, the arylcyclobutene monomer has Formula A-1 or Formula A-2, shown below:

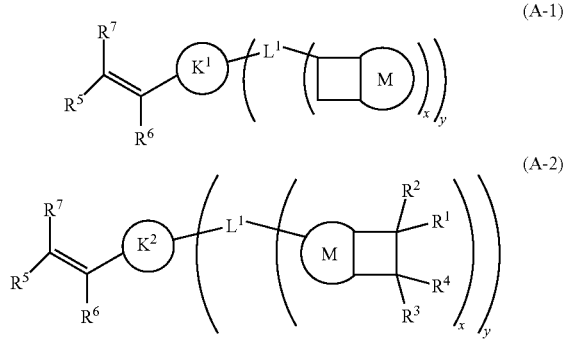

where:
$K^1$ is a divalent group selected from the group consisting of alkyl, aryl, carbocyclic aryl, polycyclic aryl, heteroaryl, aryloxy, arylalkyl, carbonyl, ester, carboxyl, ether, thioester, thioether, tertiary amine, and combinations thereof;
$K^2$ is a single bond, or a divalent group selected from the group consisting of alkyl, aryl, carbocyclic aryl, polycyclic aryl, heteroaryl, aryloxy, arylalkyl, carbonyl, ester, carboxyl, ether, thioester, thioether, tertiary amine, and combinations thereof;
$L^1$ is a covalent bond or a multivalent linking group;
M is a substituted or unsubstituted divalent aromatic radical group, or a substituted or unsubstituted divalent heteroaromatic radical group;
$R^1$-$R^7$ are the same or different and are independently selected from the group consisting of hydrogen, deuterium, alkyl, alkoxy, a substituted or unsubstituted carbocyclic aryl group, and a substituted or unsubstituted heteroaryl group; and x and y are the same or different and are an integer from 1 to 5, wherein when $L^1$ is a covalent bond, y=1.

In Formula A-1, $K^1$ can be an unsubstituted $C_{6-36}$ carbocyclic aryl group having no heteroatoms, or an unsubstituted $C_{6-18}$ carbocyclic aryl group having no heteroatoms; or a substituted $C_{6-36}$ carbocyclic aryl group having at least one substituent selected from the group consisting of alkyl and alkoxy, or a substituted $C_{6-18}$ carbocyclic aryl group having at least one substituent selected from the group consisting of alkyl and alkoxy; or an unsubstituted $C_{3-36}$ heteroaryl group, or an unsubstituted $C_{3-18}$ heteroaryl group; or a substituted $C_{6-36}$ heteroaryl group having at least one substituent selected from the group consisting of alkyl and alkoxy, or a substituted $C_{6-18}$ heteroaryl group having at least one substituent selected from the group consisting of alkyl and alkoxy; or a unsubstituted $C_{6-36}$ aryloxy group having no ring heteroatoms, or an unsubstituted $C_{6-18}$ aryloxy group having no ring heteroatoms; or a substituted $C_{3-36}$ heteroaryloxy group having at least one substituent selected from the group consisting of alkyl and alkoxy, or a substituted $C_{3-18}$ heteroaryloxy group having at least one substituent selected from the group consisting of alkyl and alkoxy; or an unsubstituted $C_{6-36}$ arylalkyl group having no heteroatoms, or an unsubstituted $C_{6-18}$ arylalkyl group having no heteroatoms; or a substituted $C_{3-36}$ heteroarylalkyl group having at least one substituent selected from the group consisting of alkyl and alkoxy, or a substituted $C_{3-18}$ heteroarylalkyl group having at least one substituent selected from the group consisting of alkyl and alkoxy.

In Formula A-1, $L^1$ is a covalent bond; or a multivalent $C_{6-12}$ carbocyclic aryl group having no ring heteroatoms; or is selected from the group consisting of phenyl, biphenyl, and naphthyl.

In Formula A-1, M is an unsubstituted $C_{6-36}$ carbocyclic aryl group having no heteroatoms, or an unsubstituted $C_{6-18}$ carbocyclic aryl group having no heteroatoms; or a substituted $C_{6-36}$ carbocyclic aryl group having at least one substituent selected from the group consisting of alkyl and alkoxy, or a substituted $C_{6-18}$ carbocyclic aryl group having at least one substituent selected from the group consisting of alkyl and alkoxy; or an unsubstituted $C_{3-36}$ heteroaryl group, or an unsubstituted $C_{3-18}$ heteroaryl group; or a substituted $C_{6-36}$ heteroaryl group having at least one substituent selected from the group consisting of alkyl and alkoxy, or a substituted $C_{6-18}$ heteroaryl group having at least one substituent selected from the group consisting of alkyl and alkoxy.

In Formula A-1, $R^5$ is hydrogen; or a $C_{1-6}$ alkyl, or a $C_{1-3}$ alkyl; or a $C_{1-6}$ alkoxy, or a $C_{1-3}$ alkoxy.

All of the above-described embodiments for $R^5$ in Formula A-1, apply equally to $R^6$ and $R^7$ in Formula A-1; or $R^5$=$R^6$=$R^7$=hydrogen.

In Formula A-1, x is 1, or 2; y is 1 or 2; or x=y=1.

In Formula A-2, $K^2$ is a covalent bond; or an unsubstituted $C_{6-36}$ carbocyclic aryl group having no heteroatoms, or an unsubstituted $C_{6-18}$ carbocyclic aryl group having no heteroatoms; or an substituted $C_{6-36}$ carbocyclic aryl group having at least one substituent selected from the group consisting of alkyl and alkoxy, or a substituted $C_{6-18}$ carbocyclic aryl group having at least one substituent selected from the group consisting of alkyl and alkoxy; or an unsubstituted $C_{3-36}$ heteroaryl group, or an unsubstituted $C_{3-18}$ heteroaryl; or a substituted $C_{6-36}$ heteroaryl group having at least one substituent selected from the group consisting of alkyl and alkoxy, or a substituted $C_{6-18}$ heteroaryl group having at least one substituent selected from the group consisting of alkyl and alkoxy; or a unsubstituted $C_{6-36}$ aryloxy group having no ring heteroatoms, or an unsubstituted $C_{6-18}$ aryloxy group having no ring heteroatoms; or a substituted $C_{3-36}$ heteroaryloxy group having at least one substituent selected from the group consisting of alkyl and alkoxy, or a substituted $C_{3-18}$ heteroaryloxy group having at least one substituent selected from the group consisting of alkyl and alkoxy; or an unsubstituted $C_{6-36}$ arylalkyl group having no heteroatoms, or an unsubstituted $C_{6-18}$ arylalkyl group having no heteroatoms; or a substituted $C_{3-36}$ heteroarylalkyl group having at least one substituent selected from the group consisting of alkyl and alkoxy, or a substituted $C_{3-18}$ heteroarylalkyl group having at least one substituent selected from the group consisting of alkyl and alkoxy.

$L^1$, M, x, and y in Formula A-1, apply equally to $L^1$, M, x, and y in Formula A-2. All of the above-described embodiments for $R^5$ in Formula A-1, apply equally to $R^1$-$R^7$ in Formula A-2.

In one embodiment, the arylcyclobutene monomer has Formula A-1-a:

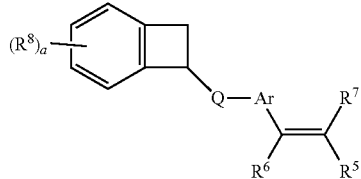

(A-1-a)

where:

Ar is a substituted or unsubstituted carbocyclic aryl or a substituted or unsubstituted heteroaryl group;

Q is a covalent bond, O, S, or $NR^a$;

$R^a$ is selected from the group consisting of hydrogen, deuterium, substituted or unsubstituted carbocyclic aryl, and substituted or unsubstituted heteroaryl;

$R^5$-$R^7$ are the same or different and are independently selected from the group consisting of hydrogen, deuterium, alkyl, alkoxy, a substituted or unsubstituted carbocyclic aryl group, and a substituted or unsubstituted heteroaryl group;

$R^8$ is selected from the group consisting of alkyl, alkoxy, a substituted or unsubstituted carbocyclic aryl group, and a substituted or unsubstituted heteroaryl group; and a is an integer from 0 to 4.

In Formula A-1-a, Ar is an unsubstituted carbocyclic aryl group having 6-36 ring carbons, or an unsubstituted carbocyclic aryl group having 6-12 ring carbons; or a substituted carbocyclic aryl group having 6-36 ring carbons and having at least one substituent selected from the group consisting of alkyl and alkoxy, or a substituted carbocyclic aryl group having 6-12 ring carbons and having at least one substituent selected from the group consisting of alkyl and alkoxy; or heteroaryl group having 3-36 ring carbons, or heteroaryl group having 3-12 ring carbons; or a substituted heteroaryl group having 6-36 ring carbons and having at least one substituent selected from the group consisting of alkyl and alkoxy, or a substituted heteroaryl group 3-12 ring carbons and having at least one substituent selected from the group consisting of alkyl and alkoxy; or selected from the group consisting of phenyl, biphenyl, and naphthyl.

In Formula A-1-a, Q is a covalent bond, or O, or S, or NH, or $NCH_3$.

In Formula A-1-a, a is 0; or 1; or 2; or >0; or >0 and at least one $R^8$ is a $C_{1-6}$ alkyl, or $C_{1-3}$ alkyl; or >0 and at least one $R^8$ is a $C_{1-6}$ alkoxy, or $C_{1-3}$ alkoxy.

All of the above-described embodiments for $R^5$ in Formula A-1, apply equally to $R^5$-$R^7$ in Formula A-1-a.

In another embodiment, the arylcyclobutene monomer has Formula A-2-a:

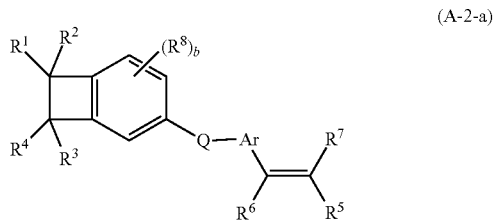

(A-2-a)

where:

Ar is a substituted or unsubstituted carbocyclic aryl or a substituted or unsubstituted heteroaryl group;

Q is a covalent bond, O, S, or NW;

$R^a$ is selected from the group consisting of hydrogen, deuterium, substituted or unsubstituted carbocyclic aryl, and substituted or unsubstituted heteroaryl;

$R^1$-$R^7$ are the same or different and are independently selected from the group consisting of hydrogen, deuterium, alkyl, alkoxy, aryloxy, a substituted or unsubstituted carbocyclic aryl group, and a substituted or unsubstituted heteroaryl group;

$R^8$ is selected from the group consisting of alkyl, alkoxy, a substituted or unsubstituted carbocyclic aryl group, and a substituted or unsubstituted heteroaryl group; and b is an integer from 0 to 3.

In Formula A-2-a, b can be 0; or 1; or 2; or >0; or >0 and at least one $R^8$ is a $C_{1-6}$ alkyl, or $C_{1-3}$ alkyl; >0 and at least one $R^8$ is a $C_{1-6}$ alkoxy, or $C_{1-3}$ alkoxy.

All of the above-described embodiments for Ar and Q in Formula A-1-a, apply equally to Ar and Q in Formula A-2-a. All of the above-described embodiments for $R^5$ in Formula A-1, apply equally to $R^1$-$R^7$ in Formula A-2-a.

Examples of the arylcyclobutene monomer can include, but are not limited to, 1-(4-vinyl phenoxy)-benzocyclobutene, 1-(4-vinyl methoxy)-benzocyclobutene, 1-(4-vinyl phenyl)-benzocyclobutene, 1-(4-vinyl hydroxynaphthyl)-benzocyclobutene, 4-vinyl-1-methyl-benzocyclobutene, 4-vinyl-1-methoxy-benzocyclobutene, and 4-vinyl-1-phenoxy-benzocyclobutene.

The diene monomer can be present in an amount of 15-30 mol %, or 20-25 mol % based on the total monomers present in the copolymerization. In one embodiment, the diene monomer has Formula B, as shown below:

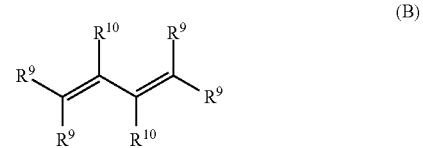

(B)

where:

$R^9$ is the same or different at each occurrence and is selected from the group consisting of hydrogen and methyl; and $R^{10}$ is the same or different at each occurrence and is selected from the group consisting of hydrogen, $C_{1-5}$ alkyl, $C_{1-5}$ alkoxy, $C_{1-5}$ thioalkyl, and $C_{5-12}$ alkenyl.

In Formula B, all $R^9$ can be hydrogen, or three $R^9$ are hydrogen and one $R^9$ is methyl. The two $R^{10}$ are the same; or different; or at least one $R^{10}$ is hydrogen; or at least one $R^{10}$ is a $C_{1-3}$ alkyl, or methyl; or at least one $R^{10}$ is a $C_{1-3}$ alkoxy, or methoxy; or at least one $R^{10}$ is an alkenyl having the formula —$(CH_2)_c$—CH=C$(R^{11})_2$, where c is an integer of 1-5 and $R^{11}$ is hydrogen or methyl.

Examples of the diene monomers can include, but are not limited to, butadiene, isoprene, 1,3-pentadiene, 2,4-hexadiene, cyclopentadiene, β-myrcene, ocimene, cyclooctadiene, farnesene, and polymerizable terpenes.

The aromatic vinyl monomer can be present in an amount of 40-60 mol % based on the total monomers present in the copolymerization. In one embodiment, the aromatic vinyl monomer has Formula C, shown below:

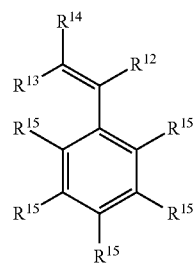

(C)

where:

$R^{12}$-$R^{14}$ are the same or different at each occurrence and is selected from the group consisting of hydrogen and $C_{1-5}$ alkyl; and $R^{15}$ is the same or different at each occurrence and is selected from the group consisting of hydrogen and $C_{1-5}$ alkyl, where adjacent $R^{15}$ groups can be joined to form a fused 6-membered aromatic ring.

In Formula C, $R^{12}$ can be hydrogen, or a $C_{1-3}$ alkyl, or methyl. $R^{12}$ in Formula C can apply equally to $R^{13}$ and $R^{14}$ in Formula C, or $R^{12}$=$R^{13}$=$R^{14}$=hydrogen.

In Formula C, all $R^{15}$ can be hydrogen; or at least one $R^{15}$ is a $C_{1-3}$ alkyl, or methyl; or one $R^{15}$ is a $C_{1-3}$ alkyl, or methyl; or two $R^{15}$ are $C_{1-3}$ alkyl, or methyl; or two $R^{15}$ are joined together to form a fused 6-membered aromatic ring.

Examples of the aromatic vinyl monomers can include, but are not limited to, styrene, α-methylstyrene, vinyl toluene, 1-vinylnaphthalene, and 2-vinylnaphthalene.

The mixture can further comprise (d) 3-10 mol % addition polymerizable vinyl substituted $C_{3-12}$ heterocycle or a vinyl-substituted $C_{3-5}$ heterocycle monomer. In some embodiments, the heterocycle monomer can be further substituted with one or more $C_{1-6}$ alkyl, a $C_{6-12}$ carbocyclic aryl, or a $C_{3-12}$ heteroaryl. The heterocycle monomer can be present in an amount of 4-7 mol % based on the total monomers present in the copolymerization. The heterocycle monomer is selected from the group consisting of N-heterocycles, S-heterocycles, N,S-heterocycles, and substituted derivatives thereof.

The N-heterocycle can have at least one ring nitrogen. Examples of N-heterocycles can include, but are not limited to, pyrrole, pyridine, diazines, triazines, imidazoles, benzoimidazoles, and quinolones. The S-heterocycle can have at least one ring sulfur. Examples of S-heterocycles can include, but are not limited to, thiophene, benzothiophene, and dibenzothiophene. The N,S-heterocycle can have at least one ring nitrogen and one ring sulfur. Examples of N,S-heterocycles can include, but are not limited to, thiazole, thiadiazole, and thiadiazine.

In one embodiment, the heterocycle monomer has Formula D, shown below:

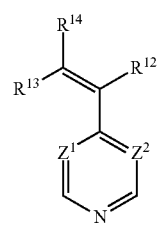

(D)

where:

$Z^1$ and $Z^2$ are the same or different and are N or $CR^{15a}$; and $R^{12}$-$R^{14}$ and $R^{15a}$ are the same or different at each occurrence and are selected from the group consisting of hydrogen and $C_{1-5}$ alkyl.

In Formula D, $Z^1 \neq Z^2$; or $Z^1 \neq Z^2$; or $Z^1$ is CH, or $CR^{15a}$, or N, or CH; or $Z^2$ is $CR^{15a}$, or N. $R^{12}$ is hydrogen, or a $C_{1-3}$ alkyl, or methyl.

All of the above-described embodiments for $R^{12}$ in Formula D, apply equally to $R^{13}$, $R^{14}$, and $R^{15a}$ in Formula D; or $R^{12}$=$R^{13}$=$R^{14}$=hydrogen.

Examples of the heterocycle monomers can include, but are not limited to, 4-vinyl pyridine, 4-vinyl-1,3-diazine, 2-vinyl-1,3,5-triazine, and 4-methyl-5-vinyl-1,3-thiazole. Furthermore, one or more additional addition polymerizable monomers can be present in the polymerization.

A polymer can be formed by copolymerizing the above-described addition polymerizable monomers by the action of a thermal initiator, photoinitiator or other photoactive compounds.

In one embodiment, the copolymerization process comprises providing a mixture of the addition polymerizable monomers described above and a radical initiator in a polar solvent; and heating the mixture to a temperature of 50-150° C. over a period of 5-50 hours. In another embodiments, the copolymerization process comprises providing a mixture of the addition polymerizable monomers described above in a polar solvent; heating the mixture to a temperature of 50-150° C. to form a heated mixture, and continuously feeding a radical initiator into the heated mixture over a period of 5-50 hours.

The polar solvent can be a single organic compound or a mixture of compounds. The polar solvent is one in which the monomers are miscible or dispersible. The polar solvent can be present in an amount of 10-70 wt. %, or 20-50 wt. % based on the total weight of the reaction mixture. In one embodiment, the polar solvent can be an aprotic organic solvent, such as (cyclo)alkanone or cyclic ester, or a linear or branched ketone and $C_{1-8}$ esters.

The radical initiator is generally an azo compound or an organic peroxide. In one embodiment, the radical initiator is an oil soluble azo compound. Such initiators can include, for example, dimethyl 2,2'-azobis(2-methylpropionate) and 2,2'-azobis(2,4-dimethylvaleronitrile). The total initiator added can be in a range of 1-5 wt. %, based on the weight of the starting reaction mixture.

After the desired reaction time, the resulting final reaction mixture is obtained, cooled to room temperature (20-25° C.), and treated as necessary. The polymers of the present disclosure may be used as is or may be isolated by adding a non-solvent, such as water or methanol, to precipitate the polymer from the solution and thereafter removing the organic solvent.

The present disclosure is directed to liquid compositions comprising the above-described polymers dissolved or dispersed in one or more organic solvents. The liquid compositions can be deposited onto a substrate to form a film using any known technique and heated to remove solvent. This can be followed by an additional heating step to cure the film. In some embodiments, the liquid compositions of the present disclosure can be used to form a dielectric film for photolithography, packaging, adhesive, sealing and bulk dielectric applications, such as in spin on coatings or buffer layers. The dielectric film formed on the substrate can be used directly or can be peeled off and used on different substrates in electronic devices.

Any substrate known in the art can be used in the present disclosure. Examples of the substrate can include, but are not limited to, silicon, copper, silver, indium tin oxide, silicon dioxide, glass, silico nitride, aluminum, gold, polyimide and epoxy mold compound.

Suitable organic solvents are those in which the polymers are soluble. Particularly useful organic solvents are any solvents useful in the making or formulation of arylcyclobutene polymers. Exemplary organic solvents include, without limitation, polar protic and polar aprotic solvents, for example, alcohols such as 2-methyl-1-butanol, 4-methyl-2-pentanol, and methyl isobutyl carbinol; esters such as ethyl lactate, propylene glycol methyl ether acetate, methyl 2-hydroxyisobutyrate, methyl 3-methoxypropionate, n-butyl acetate and 3-methoxy-1-butyl acetate; lactones such as gamma-butyrolactone; lactams such as N-methylpyrrolidinone; ethers such as propylene glycol methyl ether and dipropylene glycol dimethyl ether isomers, such as PROGLYDE™ DMM (The Dow Chemical Company, Midland, Mich.); ketones such as 2-butanone, cyclopentanone, cyclohexanone and methylcyclohexanone; and mixtures thereof.

Suitable additives can be added into the liquid compositions of the present disclosure. Examples of the additives can include, without limitation, one or more of each of curing agents, crosslinkers, such as crosslinking monomers separate from the polymer, surfactants, inorganic fillers, organic fillers, plasticizers, adhesion promoters, metal passivating materials, and combinations of any of the foregoing. Suitable surfactants are well-known to those skilled in the art, and nonionic surfactants are preferred. Such surfactants may be present in an amount of from 0 to 10 g/L, or from 0 to 5 g/L.

Any suitable inorganic fillers may optionally be used in the present compositions, and are well-known to those skilled in the art. Exemplary inorganic fillers can include, but are not limited to, silica, silicon carbide, silicon nitride, alumina, aluminum carbide, aluminum nitride, zirconia, and mixtures thereof. The inorganic filler may be in the form of powders, rods, spheres, or any other suitable shapes. Such inorganic fillers may have any suitable dimensions. Such inorganic fillers may comprise a coupling agent, such as a silane or a titanate in conventional amounts. Inorganic fillers may be used in an amount of from 0 to 80 wt. %, or from 40 to 80 wt. %, as solids based on the total weight of the composition. In some embodiments, no inorganic fillers are present.

The metal passivating material can be a copper passivating agent. Suitable copper passivating agents are well known in the art and include imidazoles, benzotriazoles, ethylene diamine or its salts or acid esters, and iminodiacetic acids or salts thereof.

Any suitable crosslinker may be optionally used in the present liquid composition. A suitable crosslinker may react with functional groups in the resin composition, including alkenes and Diels Alder dienes as chosen by one skilled in the art. Such suitable crosslinkers may include multifunctional thiols, multifunctional azides, multifunctional azirines, and bis-arylcyclobutene monomers as well as multifunctional dienophiles such as (meth)acrylates, maleimides, allyl compounds, vinyl silane compounds, or other suitable dienophiles, provided that they crosslink with the polymer of the present disclosure under the conditions used to cure the composition. The selection of such crosslinkers is within the ability of those skilled in the art. Such crosslinkers are typically used in an amount of from 0 to 30 wt. %, or from 0 to 15 wt. %, based on the total weight of the polymerizable monomers in the composition.

A variety of curing agents may be used in the liquid compositions of the present disclosure which are useful in photolithography. Suitable curing agents may aid in the curing of the bis-benzocyclobutene containing materials, and may be activated by heat or light. Exemplary curing agents can include, but are not limited to, thermally generated initiators and photoactive compounds (photogenerated initiators). The selection of such curing agents is within the ability of those skilled in the art. Preferred thermal generated initiators are free radical initiators, such as, but not limited to, azobisisobutyronitrile, dibenzoyl peroxide, and dicumylperoxide. Preferred photoactive curing agents are free radical photoinitiators available from BASF under the Irgacure brand, and diazonaphthoquinone (DNQ) compounds including sulfonate esters of a DNQ compound. Suitable DNQ compounds are any compounds having a DNQ moiety, such as a DNQ sulfonate ester moiety, and that function as photoactive compounds in the present compositions, that is, they function as dissolution inhibitors upon exposure to appropriate radiation. Suitable DNQ compounds are disclosed in U.S. Pat. Nos. 7,198,878 and 8,143,360, the entire contents of which are incorporated herein by reference.

The amount of photoactive compound varies from 0 to 30 wt. %, based on the total weight of the polymer solids. When present, the photoactive compound is typically used in an amount of 5 to 30 wt. %, or from 5 to 25 wt. %, or from 10 to 25 wt. %, based on the total weight of polymer solids.

Any suitable adhesion promoter may be used in the liquid compositions of the present disclosure and the selection of such adhesion promoter is well within the ability of those skilled in the art. Preferred adhesion promoters are silane-containing materials or tetraalkyl titanates, or trialkoxysilane-containing materials. Exemplary adhesion promoters include, but are not limited to, bis(trialkoxysilylalkyl)benzenes such as bis(trimethoxysilylethyl)benzene; aminoalkyl trialkoxy silanes such as aminopropyl trimethoxy silane, aminopropyl triethoxy silane, and phenyl aminopropyl triethoxy silane; and other silane coupling agents, as well as mixtures of the foregoing. Adhesion promoters may be applied first as a primer layer or as an additive to the composition. Particularly suitable adhesion promoters include AP 3000, AP 8000, and AP 9000C, (Dow Electronic Materials, Marlborough, Mass.). The liquid compositions of the present disclosure may contain from 0 to 15 wt. %, or from 0.5 to 10 wt. %, or from 1 to 10 wt. %, or from 2 to 10 wt. % of an adhesion promoter based on the total weight of the composition.

Photolithographic liquid compositions of the present disclosure may be prepared by combining one or more polymers of the present disclosure, any organic solvents, water or additional components and a photoactive compound as a curing agent in any order. The organic solvents are the same as those described above. When the present compositions containing the photoactive compound, such as a diazonaphthoquinone, an onium salt or photoinitiator, it is preferred that the curing agent is first dissolved in a suitable organic solvent or aqueous alkali, then combined with one or more present polymers and any optional surfactant, and then combined with any optional adhesion promoter. Selection of a suitable photoactive compound is within the ordinary level of skill in the art.

In some embodiments, the liquid compositions of the present disclosure may be coated or deposited on a substrate by any suitable method. The substrates are the same as those described above. Suitable methods for coating the present compositions can include, but are not limited to, spin-coating, curtain coating, spray coating, roller coating, dip coating, vapor deposition, and lamination such as vacuum lamination, among other methods. In the semiconductor manufacturing industry, spin-coating is a preferred method to take advantage of existing equipment and processes. In spin-coating, the solids content of the composition may be adjusted, along with the spin speed, to achieve a desired thickness of the composition on the surface it is applied to.

When the liquid compositions of the present disclosure do not contain an adhesion promoter, the surface of the substrate to be coated with the present compositions may optionally first be contacted with a suitable adhesion promoter or vapor treated. Various vapor treatments known in the art may increase the adhesion of the polymers of the present disclosure to the substrate surface, such as plasma treatments. In certain applications, it may be preferred to use an adhesion promoter o treat the substrate surface prior to coating the surface with the present compositions. The adhesion promoter is the same as those described above.

Typically, the liquid compositions of the present disclosure are spin-coated at a spin speed of 400 to 4000 rpm. The amount of the present compositions dispensed on the wafer or substrate depends on the total solids content in the composition, the desired thickness of the resulting layer, and other factors well-known to those skilled in the art. When a film or layer of the present compositions is cast by spin-coating, much (or all) of the solvent evaporates during deposition of the film. Preferably, after being disposed on a surface, the composition is heated (soft-baked) to remove any remaining solvent. Typical baking temperatures are from 90 to 120° C., although other temperatures may be suitably used. Such baking to remove residual solvent is typically done for approximately one or two minutes, although longer or shorter times may suitably be used.

The polymers of the present disclosure are typically cured by heating for a period of time. Suitable curing temperatures range from 140 to 300° C.; or from 170 to 250° C. Typically curing times range from 1 to 600 minutes, or from 30 to 240 minutes, or from 30 to 120 minutes.

In one embodiment, the liquid compositions comprising the polymer described herein can be spin cast onto a copper. The composition can be cast via a slot die coater or other suitable apparatus to form a dry film desirable for microelectronic applications. The cast films can be soft baked to remove residual solvent for 30 seconds to 10 minutes at temperatures of 70-150° C., or of 90-120° C. The soft baked film can then be subjected to a curing condition of 150-250° C. for 30 minutes to 4 hours.

In some embodiments, layers of the liquid compositions of the present disclosure may also be formed as a dry film and disposed on the surface of a substrate by lamination. A variety of suitable lamination techniques, including vacuum lamination techniques, may be used and are well known to those skilled in the art. In forming a dry film, the present compositions are first disposed, such as coated, onto a front surface of a suitable film support sheet such as a polyester sheet, preferably polyethylene terephthalate (PET) sheet, or a polyimide sheet such as KAPTON™ polyimide (DuPont, Wilmington, Del.), using slot-die coating, gravure printing, or another appropriate method. The composition is then soft baked at a suitable temperature, such as from 90 to 140° C., for an appropriate time, such as from 1 to 30 minutes, to remove any solvent. A polymer film cover sheet such as polyethylene is then roll-laminated at room temperature (20-25° C.) onto the dried composition to protect the composition during storage and handling. To dispose the dried composition onto the substrate, the cover sheet is first removed. Then, the dried composition on the support sheet is laminated onto the substrate surface using roll-lamination or vacuum lamination. The lamination temperature can range from 20 to 120° C. The support sheet is then removed (peeled), leaving the dried composition on that surface.

The resulting cured film has good tensile strength, tensile elongation, good adhesion to desired substrates such as copper, and low dielectric loss at high frequency. The polymers disclosed herein can achieve these good properties without the aid of any kind of inorganic filler. The dielectric films can have Dk values less than 3.0 and Df values less than 0.004 at high frequencies (10 or 28 GHz). In some embodiments, the dielectric films have a Dk≤2.6 and a Df≤0.004 at a frequency of 10 GHz. In some embodiments, the dielectric films have a Dk≤2.6 and a Df≤0.004 at a frequency of 28 GHz.

The present disclosure is also directed to a wide variety of electronic device comprising at least one layer of the dielectric film of the present application on an electronic device substrate. The electronic device substrate can be any substrate for use in the manufacture of any electronic device. Exemplary electronic device substrates include, without limitation, semiconductor wafers, glass, sapphire, silicate materials, silicon nitride materials, silicon carbide materials, display device substrates, epoxy mold compound wafers, circuit board substrates, and thermally stable polymers. As used herein, the term "semiconductor wafer" is intended to encompass a semiconductor substrate, a semiconductor device, and various packages for various levels of interconnection, including a single-chip wafer, multiple-chip wafer, packages for various levels, substrates for light emitting diodes (LEDs), or other assemblies requiring solder connections. Semiconductor wafers, such as silicon wafers, gallium-arsenide wafers, and silicon-germanium wafers, may be patterned or unpatterned. As used herein, the term "semiconductor substrate" includes any substrate having one or more semiconductor layers or structures which include active or operable portions of semiconductor devices. The term "semiconductor substrate" is defined to mean any construction comprising semiconductive material, such as a semiconductor device. A semiconductor device refers to a semiconductor substrate upon which at least one microelectronic device has been or is being fabricated. Thermally stable polymers include, without limitation, any polymer stable to the temperatures used to cure the arylcyclobutene material, such as polyimide, for example, KAPTON™ polyimide (DuPont, Wilmington, Del.), liquid crystalline polymers, for example VECSTAR™ LCP film (Kuraray, Tokyo, Japan) and Bismaleimide-Triazine (BT) resins (MGC, Tokyo, Japan).

EXAMPLES

Materials:

Beta-myrcene (food grade), a twenty-weight percent butadiene solution in toluene, 4-methy-5-vinyl-1,3-thiazole and styrene were obtained from Sigma Aldrich. Vazo 65 and Vazo 601 diazo initiators were purchased from Wako Chemical. Vinyl phenoxy BCB [1-(4-vinylphenoxy)benzocyclobutene)] was prepared according to US Pat. Application No. 20190169327A1, the entire contents of which are incorporated herein by reference. 4-vinylpyridine was purchased from Sigma Aldrich and distilled prior to use. Vinyl toluene isomeric mixture was received from the Deltech Corporation. All other solvents and chemicals were received from the Dow Chemical Company and used as received without additional purification.

Test Methods (1) Dielectric Properties:

The IPC test method TM-650 2.5.5.1 was used to determine dielectric properties of free-standing films using a Keysight 85072A split cylinder resonator operating between 10 and 28 GHz and a Keysight N5224A PNA network analyzer. The film geometry was such that the substrate extends beyond the diameter of the two cylindrical cavity sections. Film thickness was 50 µm.

Free-standing films were placed in the cavity of the split cylinder resonator and the resonant frequency and quality factor of the $TE_{011}$ resonant mode were measured using the network analyzer. Relative permittivity (Dk) and loss tangent (Df) of the films were calculated from the $TE_{011}$ resonant mode using software provided by Keysight.

(2) Molecular Weight Determination Procedure:

Polymer sample was prepared as a 0.5 wt. % solution in tetrahydrofuran and filtered through a 0.2-micron Teflon filter. The mobile phase was tetrahydrofuran. The columns were Waters Styragel HRSE 7.8×300 mm column lot number 0051370931. Injection volume was 100 microliters and run time was 27 minutes. Molecular weight data is reported relative to polystyrene standards.

Example A

To a 100 ml EasyMax™ glass reactor was added beta-myrcene (0.98 g), 1-(4-vinylphenoxy)benzocyclobutene (9.31 g) and styrene (9.36 g). Anisole (6.67 g) was then added into the reactor. The reactor was assembled and mixed under mechanical stirring until homogenized. The internal reactor temperature was then increased to 80° C., at which point a solution of V65 (0.68 g) in anisole (13.33 g) was added at a constant rate over twenty hours. When the addition was complete, the reactor was held at 80° C. for an additional two hours, then the temperature was decreased to room temperature (20-25° C.). An aliquot was taken for GPC analysis, and the resulting solution was filtered through a 5 µm pore size Nylon™ filter into a glass bottle for use. GPC Mn: 27.4 k, Mw: 584.5 k.

Example B

An identical procedure was used as in Example A, except that 2.019 g beta myrcene, 9.578 g 1-(4-vinylphenoxy)benzocyclobutene, 8.88 g styrene and 6.21 g mesitylene were added to the reactor. At the reaction temperature reached to 80° C., a solution of 0.7 g of V65 in 12.99 g mesitylene was added. GPC data: Mw 125.5 k, Mn 20.3 k.

Example 1

An identical procedure was used as in Example A, except that 5.18 g beta myrcene, 16.40 g 1-(4-vinylphenoxy)benzocyclobutene, 13.95 g styrene and 15.43 g anisole were added to the reactor. An initiator feed of 1.20 g V65 and 8.57 g ansiole was added. GPC Mn: 11.8 k, Mw: 54.4 k.

Example 2

An identical procedure was used as in Example A, except that 5.52 g beta myrcene, 12.40 g 1-(4-vinylphenoxy)benzocyclobutene, 9.58 g styrene and 6.88 g cyclopentanone was added to the reactor. An initiator feed of 0.91 g V65 and 15.625 g cyclopentanone was fed into the reaction mixture over 18 hours. GPC Mn: 7.9 k, Mw: 23.2 k.

Example 3

An identical procedure was used as in Example A, except that 8.37 g beta myrcene, 13.11 g 1-(4-vinylphenoxy)benzocyclobutene, 8.19 g styrene and 5.29 g cyclopentanone was added to the reactor. An initiator feed of 0.97 g V65 and 14.71 g cyclopentanone was added. GPC Mn: 9.6 k, Mw: 29.1 k.

The above as-formed polymer solutions were deposited via spin coating onto suitable Cu wafer substrates, 200 mm in diameter, and soft baked at 110° C. for 90 seconds. Polymer films were then cured in a BlueM oven at 200° C. for one hour under nitrogen, less than 100 ppm of oxygen. The resulting substrate was cleaved into suitable sizes and films were lifted in a 5% ammonium sulfate in water bath, rinsed and dried to obtain free standing films for test. The polymer compositions are given in Table 1 and the test data of the films prepared from the polymer composition are listed in Table 2 as shown below, respectively.

TABLE 1

Polymer Composition

| Example | Monomer mol % | | |
|---|---|---|---|
| | Styrene | BCB[1] | Beta-myrcene |
| A | 65 | 30 | 5 |
| B | 60 | 30 | 10 |
| 1 | 55 | 30 | 15 |
| 2 | 50 | 30 | 20 |
| 3 | 40 | 30 | 30 |

[1]BCB: 1-(4-vinylphenoxy)benzocyclobutene

TABLE 2

Film Test Data

| Example | Dk 10 GHz | Df 10 GHz | Dk 28 GHz | Df 28 GHz |
|---|---|---|---|---|
| A | 2.71 | 0.0078 | 2.71 | 0.0068 |
| B | 2.65 | 0.0051 | 2.65 | 0.0056 |
| 1 | 2.60 | 0.0036 | 2.62 | 0.0039 |
| 2 | 2.54 | 0.0025 | 2.55 | 0.0028 |
| 3 | 2.6 | 0.0038 | 2.48 | 0.0035 |

The results indicate that the Df initially decreases as the mol % diene is increased. However, as the mol % diene is increased over about 25 mol %, the Df increases. Similarly, Dk initially decreases as the mol % diene is increased.

Example 4

An identical procedure was used as in Example A, except that 15.52 g butadiene toluene solution, 19.14 g 1-(4- vinylphenoxy)benzocyclobutene, 15.26 g vinyl toluene, 1.51 g 4-vinylpyridine, 0.99 g V601 and 10.0 g cyclohexanone were mixed then divided between three sealed tubes, then placed into a suitable insert into the reactor. The sealed system was heated to 80° C. and held for 17 hours then returned to 25° C. for use. GPC Mn: 14.2 k, Mw: 40.9 k.

Example 5

An identical procedure was used as in Example A, except that 5.1 g beta myrcene, 12.1 g 1-(4-vinylphenoxy)benzocyclobutene, 9.53 g vinyl toluene, 1.01 g 4-vinylpyridine and 11.79 g anisole were added to the reactor. At the reaction temperature of 80° C., 0.41 g of V601 was added. The reaction was held for 15 hours, then an initiator feed of 0.41 g V65 and 10.71 g anisole was fed over 12 hours, following by an additional 2 hour hold at 80° C. before returning to 25° C.

Example 6

An identical procedure was used as in Example A, except that 5.98 g beta myrcene, 14.18 g 1-(4-vinylphenoxy)benzocyclobutene, 11.19 g vinyl toluene, 1.33 g 4-methyl-5-vinylthiazole and 6.21 g cyclohexanone were added to the reactor. At the reaction temperature of 80° C., a solution of 1.04 g of V65 in 12.86 g cyclohexanone was used. GPC data: Mw 32.1 k, Mn 11.1 k.

Example 7

An identical procedure was used as in Example A, except that 6.33 g beta myrcene, 12.01 g 1-(4-vinylphenoxy)benzocyclobutene, 8.83 g vinyl toluene, 0.6 g 4-vinylpyridine and 11.79 g anisole were added to the reactor. At the reaction temperature of 80° C., 0.41 g of V601 was added. The reaction was held for 15 hours, then 0.41 g V65 in 10.71 g anisole was fed over 12 hours, following by an additional 2 hour hold at 80° C. before returning to 25° C. GPC data: Mw 50.6 k, Mn 10.6 k.

Example 8

An identical procedure was used as in Example A, except that 6.33 g beta myrcene, 12.02 g 1-(4-vinylphenoxy)benzocyclobutene, 8.42 g vinyl toluene, 1.0 g 4-vinylpyridine and 11.79 g anisole was added to the reactor. At the reaction temperature of 80° C., 0.41 g of V601 were added. The reaction was held for 15 hours, then 0.41 g V65 in 10.71 g anisole was fed over 12 hours, following by an additional 2 hour hold at 80° C. before returning to 25° C.

Example 9

An identical procedure was used as in Example A, except that 11.76 g beta myrcene, 13.95 g 1-(4-vinylphenoxy)benzocyclobutene, 6.12 g vinyl toluene, 1.14 g 4-vinyl pyridine and 14.14 g cyclohexanone were added to the reactor. At the reaction temperature of 80° C., a solution of 1.02 g of V65 in 12.86 g cyclohexanone was used. GPC data: Mw 19.3 k, Mn 4.4 k.

Example 10

An identical procedure was used as in Example A, except that 17.18 g beta myrcene, 16.31 g 1-(4-vinylphenoxy) benzocyclobutene, 4.29 g vinyl toluene, 1.33 g 4-vinyl pyridine and 9.75 g cyclohexanone were added to the reactor. At the reaction temperature of 80° C., a solution of 1.19 g of V65 in 11.2 g cyclohexanone was used. GPC data: Mw 19.7 k, Mn 6.7 k.

Films were prepared from the above as-formed polymer solutions as described above. The polymer compositions are given in Table 3 and the test data of the films prepared from the polymer compositions are listed in Table 4 below, respectively.

TABLE 3

Polymer Composition

| | Monomer mol % | | | |
|---|---|---|---|---|
| Example | Vinyl Aromatic[2] | BCB | Diene[3] | Vinyl Heterocycle[4] |
| 4 | 45 | 30 | 20 | 5 |
| 5 | 45 | 30 | 20 | 5 |
| 6 | 45 | 30 | 20 | 5 |
| 7 | 42 | 30 | 25 | 3 |
| 8 | 40 | 30 | 25 | 5 |
| 9 | 25 | 30 | 40 | 5 |
| 10 | 15 | 30 | 50 | 5 |

[2] Vinyl Aromatic: vinyl toluene isomeric mixture.
[3] Diene: butadiene for Example 4 and beta-myrcene for all others.
[4] Vinyl Heterocycle: methyl-5-vinylthiazole for Example 6 and 4-vinylpyridine for all others.

TABLE 4

Film Test Data

| Example | Dk 10 GHz | Df 10 GHz | Dk 28 GHz | Df 28 GHz |
|---|---|---|---|---|
| 4 | 2.60 | 0.002 | 2.59 | 0.0023 |
| 5 | 2.43 | 0.002 | 2.44 | 0.0022 |
| 6 | ND | ND | 2.55 | 0.0028 |
| 7 | 2.36 | 0.002 | 2.41 | 0.0021 |
| 8 | 2.26 | 0.0021 | 2.32 | 0.0021 |
| 9 | 2.42 | 0.003 | 2.38 | 0.0032 |
| 10 | 2.52 | 0.0035 | 2.56 | 0.0039 |

ND = not determined

The results indicate that as the mol % diene is increased over about 25 mol %, the Df increases. Similarly, Dk initially decreases as the mol % diene is increased. However, as the mol % diene is increased over about 40 mol %, the Dk increases.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

It is to be appreciated that certain features are, for clarity, described herein in the context of separate embodiments, may also be provided in combination in a single embodiment. Conversely, various features that are, for brevity, described in the context of a single embodiment, may also be provided separately or in any subcombination. The use of numerical values in the various ranges specified herein is stated as approximations as though the minimum and maximum values within the stated ranges were both being preceded by the word "about." In this manner, slight variations above and below the stated ranges can be used to achieve substantially the same results as values within the ranges. Also, the disclosure of these ranges is intended as a continuous range including every value between the minimum and maximum average values including fractional values that can result when some of components of one value are mixed with those of different value. Moreover, when broader and narrower ranges are disclosed, it is within the contemplation of this disclosure to match a minimum value from one range with a maximum value from another range and vice versa.

What is claimed is:

1. A polymer comprising a copolymerization product from a mixture comprising:
   (a) 10-50 mol %, based on the total monomers present in the copolymerization, of at least one addition polymerizable arylcyclobutene monomer of Formula A-1-a,

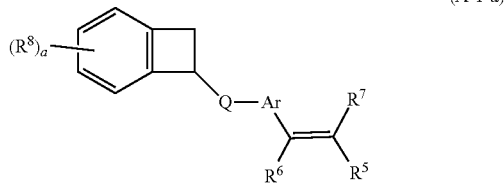

(A-1-a)

wherein:
   Ar is a substituted or unsubstituted carbocyclic aryl or a substituted or unsubstituted heteroaryl group;
   Q is a covalent bond, O, S, or $NR^a$;
   $R^a$ is selected from the group consisting of hydrogen, deuterium, substituted or unsubstituted carbocyclic aryl, and substituted or unsubstituted heteroaryl;
   $R^5$-$R^7$ are the same or different and are independently selected from the group consisting of hydrogen, deuterium, alkyl, alkoxy, a substituted or unsubstituted carbocyclic aryl group, and a substituted or unsubstituted heteroaryl group;
   $R^8$ is the same or different at each occurrence and is selected from the group consisting of alkyl, alkoxy, a substituted or unsubstituted carbocyclic aryl group, and a substituted or unsubstituted heteroaryl group; and
   a is an integer from 0 to 4;
   (b) 15-50 mol %, based on the total monomers present in the copolymerization, of at least one addition polymerizable diene monomer;
   (c) 15-60 mol %, based on the total monomers present in the copolymerization, of at east one addition polymerizable aromatic vinyl monomer; and
   (d) 3-10 mol %, based on the total monomers present in the copolymerization, of at least one addition polymerizable vinyl substituted $C_{3-12}$ heterocycle monomer.

2. The polymer of claim 1, wherein the mixture comprises (a) 20-40 mol %, based on the total monomers present in the copolymerization, of the at least one arylcyclobutene monomer.

3. The polymer of claim 1, wherein the mixture comprises (b) 15-30 mol %, based on the total monomers present in the copolymerization, of the at least one diene monomer.

4. The polymer of claim 3, wherein the mixture comprises (b) 20-25 mol %, based on the total monomers present in the copolymerization, of the at least one diene monomer.

5. The polymer of claim 1, wherein the at least one diene monomer has Formula B,

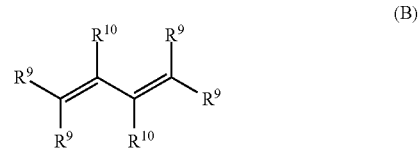

(B)

where:
   $R^9$ is the same or different at each occurrence and is selected from hydrogen and methyl; and
   $R^{10}$ is the same or different at each occurrence and is selected from the group consisting of hydrogen, $C_{1-5}$ alkyl, $C_{1-5}$ alkoxy, $C_{1-5}$ thioalkyl, and $C_{5-12}$ alkenyl.

6. The polymer of claim 1, wherein the mixture comprises (c) 40-60 mol %, based on the total monomers present in the copolymerization, of the at least one aromatic vinyl monomer.

7. The polymer of claim 1, wherein the at least one aromatic vinyl monomer has Formula C

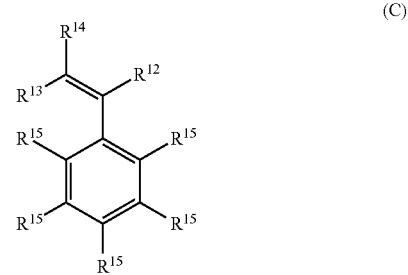

(C)

where:
   $R^{12}$-$R^{14}$ are the same or different at each occurrence and is selected from the group consisting of hydrogen and $C_{1-5}$ alkyl; and
   $R^{15}$ is the same or different at each occurrence and is selected from the group consisting of hydrogen and $C_{1-5}$ alkyl, where adjacent $R^{15}$ groups can be joined to form a fused 6-membered aromatic ring.

8. The polymer of claim 1, wherein the at least one heterocycle monomer is selected from the group consisting of N-heterocycles, S-heterocycles, N,S-heterocycles, and derivatives thereof substituted with one or more of a $C_{1-6}$ alkyl, a $C_{6-12}$ carbocyclic aryl, or a $C_{3-12}$ heteroaryl.

9. The polymer of claim 1, wherein the at least one vinyl substituted $C_{3-12}$ heterocycle is selected from the group consisting of 4-vinyl pyridine, 4-vinyl-1,3-diazine, 2-vinyl-1,3,5-triazine, and 4-methyl-5-vinyl-1,3-thiazole.

10. A liquid composition comprising the polymer of claim 1 and a solvent.

11. The liquid composition of claim 10, wherein the solvent is selected from the group consisting of cyclopentanone, cyclohexanone, propylene glycol monomethyl ether, propylene glycol monomethyl ether acetate, gamma-butyrolactone, 3-methoxypropionate, dipropylene glycol dimethyl ether, 3-methoxybutyl acetate, anisole, mesitylene, 2-heptanone, cyrene, 2-butanone, ethyl lactate, amyl acetate, n-butyl acetate, N-methyl-2-pyrrolidone, and N-butyl-2-pyrrolidone.

* * * * *